UNITED STATES PATENT OFFICE.

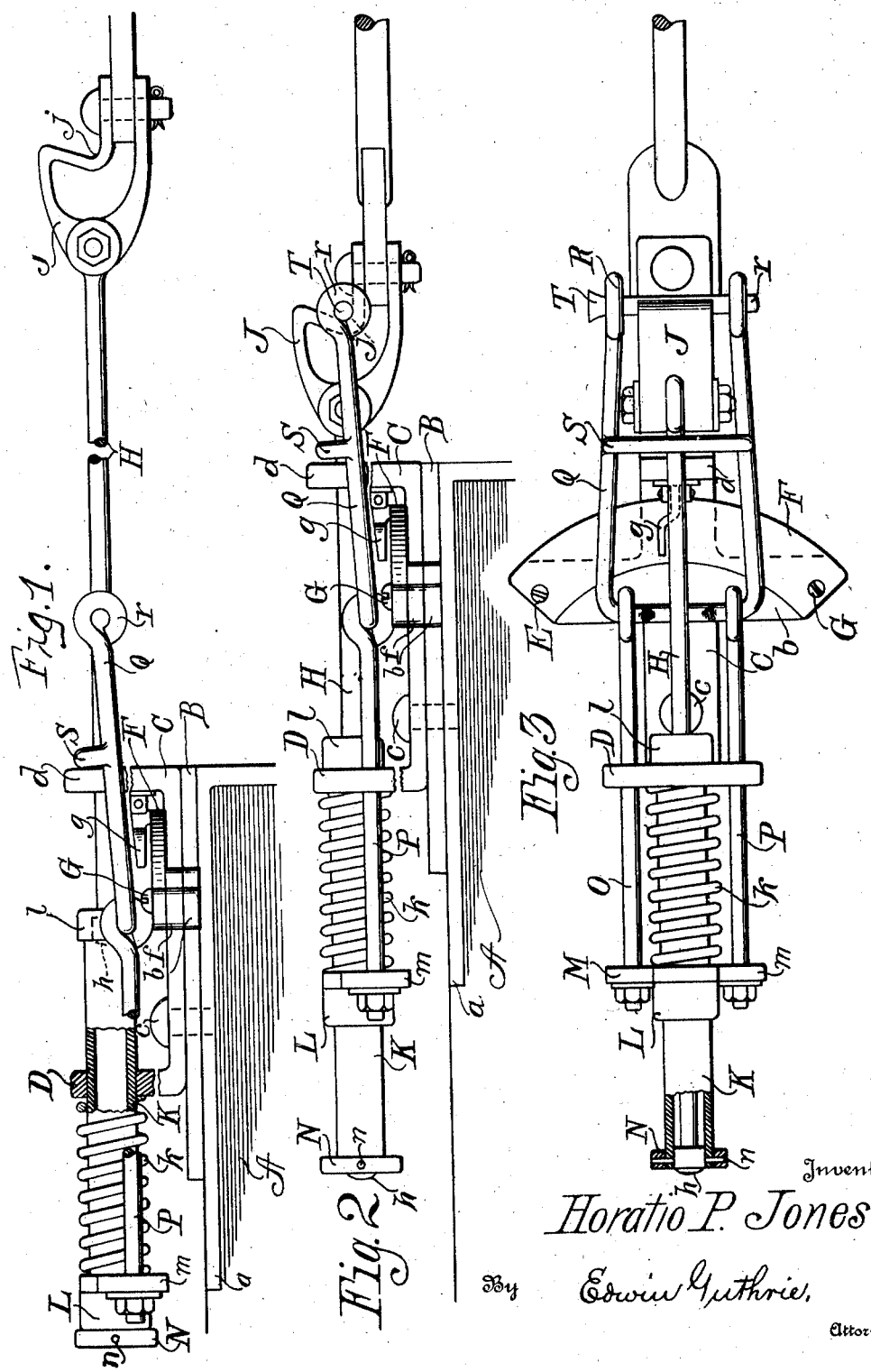

HORATIO P. JONES, OF DANVILLE, PENNSYLVANIA.

IMPLEMENT-HITCH.

1,360,223.     Specification of Letters Patent.     Patented Nov. 23, 1920.

Application filed March 16, 1920, Serial No. 366,193. Renewed October 16, 1920. Serial No. 417,482.

*To all whom it may concern:*

Be it known that I, HORATIO P. JONES, citizen of the United States, residing at Danville, in the county of Montour and State of Pennsylvania, have invented certain new and useful Improvements in Implement-Hitches, of which the following is a specification.

This invention relates to implement hitches, more particularly to the general class of coupling devices by which agricultural machines, plows, or trailer vehicles of any kind may be connected to tractors intended to draw them along.

This invention is believed to be an improvement upon the construction of the implement hitch described and claimed in Letters Patent of the United States issued to applicant in this case December 30, 1919, numbered 1,326,271, and is for the same purposes. The improvement consists in the changes of form and arrangement of the parts which may be explained by stating that after trying out the particular mechanism shown in the patent, it was discovered that a material advantage would result from providing some means of absorbing the shock or jerk of the tractor when starting. This is accomplished by employing two side rods, suitably supported and guided, connecting the U-shaped latch member with a plate or yoke located at the end of the coil spring. By means of the improved construction, it is practicable to utilize the same coil spring for absorbing the shock of the initial pull of the tractor on starting, as well as the shock or jerk of the draw rod when an obstacle is met with and the breakable pin gives way.

In the accompanying drawings the special construction and arrangement of the parts of this invention are illustrated. Figure 1 is a side view of all parts with the draw rod in its extended position. Fig. 2 is a side view of all parts with the draw rod in its retracted position, showing the breakable pin in engagement with the shoulder of the connector or clevis at the end of the draw rod. Fig. 3 is a plan view of all parts assembled in the positions set forth in Fig. 2.

Throughout the drawings and description, the same letter is employed to refer to the same part.

Considering the drawings, the object or machine to be drawn along is assumed to be a plow, of which the beam is marked A, and of which the end is protected by a guard plate $a$. Upon the guard plate is a cap plate B, and this plate has side extensions or wings such as the wing $b$. Upon the cap plate is a rider plate or saddle C, secured pivotally to the cap plate by the kingbolt or pivot pin $c$. The saddle has the vertical ends D and $d$. Above the saddle is a curved plate F, and directly beneath the ends of the plate F are blocks $f$ which space the curved plate from the wings $b$ of the cap plate B. The curved plate, space blocks and wings $b$ are held together by means of screws E and G best shown in Fig. 3. It will be noted that the saddle passes between the curved plate F and the cap plate, and that the curved plate acts as a keeper to prevent the saddle from being displaced upwardly. The saddle may move either way with the pin $c$ as a pivot, such oscillatory movement being horizontal. As shown in all the figures, the saddle carries a latch $g$ by which it may be releasably secured to the curved plate F in its middle position. The curved plate is provided with a slot or notch to engage the toe or lug of the latch. The notch is not shown as it does not form a part of this invention.

Passing through the upright ends D and $d$ of the saddle C is the draw rod H, which has at one end a head $h$, and at the other end a connector or clevis J provided with a shoulder $j$. The head $h$ of the rod is movably located in a cylinder K that passes movably through and is supported by the end D of the saddle, and a coil spring $k$ encircles the cylinder between the upright end D of the saddle and a yoke L movable on the exterior of the cylinder at a small distance from the end of the saddle. The right hand end of the cylinder adjacent to the end D of the saddle is closed by a screw cap $l$, by which the head $h$ of the draw rod is retained in the cylinder, and against which the rod pulls when extended as illustrated in Fig. 1.

The yoke L on the cylinder K has its side portions extended and marked M and $m$, as best shown in Fig. 3.

On the end of the cylinder K after it has been passed through the yoke L, there is secured a collar N, by means of a pin $n$.

Considering Fig. 3 it will be noted that the side extensions M and $m$ of the yoke are connected with the ends of the twin side rods O and P, and that the other ends of the side rods are pivotally connected with the transverse portion of a U-shaped latch or member Q. The ends of the legs of the U-shaped member are provided with the eyes R and r. The member Q has also a transverse piece or bar S that passes over the draw rod H, and the function of which is to support the member Q upon the draw rod when the parts are in position as set out in Fig. 1, that is to say, with the draw rod pulled out. Through the eyes R and r of the member Q, there is passed a pin T, which in practice is made of some breakable material usually wood. Obviously, any pin would make the connection for draft purposes only, leaving out of consideration the protection of the parts concerned from over-strain as explained in this description.

The operation of this invention is substantially the same as explained in my said Patent numbered 1,326,271. It is not necessary that the draw-bar of the tractor shall be in direct line or on level with the draw rod H. That rod may be pulled out and turned either to the right or left, swinging the saddle correspondingly, and the connector J may be turned up or down to effect the desired coupling. The tractor being started straight ahead pulls the draw rod straight. The tractor is then backed until the breakable pin T engages the shoulder of the connector. Now, upon starting up the pulling effect is cushioned, being exerted by way of the side rods through the yoke L against the spring k. A sudden violent jerk from any cause breaks the pin and the draw rod is drawn out until the head h encounters the screw cap l of the cylinder. Then, the cylinder is drawn along bodily through the upright end D of the saddle until the collar N strikes the yoke L, whereupon the pull on the draw rod is cushioned by the spring k. Thus, the initial starting effect with the parts arranged in their proper positions, that is to say, with the pin T engaging the shoulder of the connector J, and the emergency or extraordinary pull when the pin breaks are both taken up by the same spring.

Having now described this invention, and explained the mode of its operation, what I claim is:—

1. In an implement hitch, the combination with a saddle, of a draw rod movable lengthwise thereon and having a connector at one end provided with a shoulder, a breakable pin engaging said shoulder, movable and pivotal devices connected with the pin, and resilient means for cushioning the pull upon the said pin in the shoulder and for limiting and cushioning the longitudinal movement of the draw rod when the pin breaks.

2. In an implement hitch, the combination with a support, of a horizontally oscillating saddle pivotally mounted upon the said support, a draw rod on the saddle movable lengthwise and having a connector at one end provided with a shoulder, a breakable pin engaging the said shoulder, the said connector being pivotally movable vertically, movable and pivotal devices connected with the said pin, and resilient means for cushioning the pull upon the said pin in the shoulder and for limiting and cushioning the longitudinal movement of the draw rod when the pin breaks.

3. In an implement hitch, the combination with a saddle, of a draw rod thereon movable lengthwise and having a connector at one end provided with a shoulder, a breakable pin engaging the said shoulder, a U-shaped member having ends constructed to hold the pin, movable and pivotal devices connected with the said member, and resilient means acting upon the said devices for cushioning the pull upon the said member and for cushioning the longitudinal movement of the draw rod when the pin breaks.

4. In an implement hitch, the combination with a support, of a saddle pivotally connected with the support, a draw rod movably mounted in the saddle, the said draw rod having a connector at one end and a head at the other end, the said connector having a shoulder, a cylinder movably carried by the saddle, the said head of the draw rod being movably located in the said cylinder, one end of the cylinder being closed to retain the head in the cylinder, a yoke attached to the said cylinder at a distance from the saddle, a spring encircling the cylinder between the said saddle and the said yoke, a collar secured to the end of the cylinder, side rods attached to the yoke, a U-shaped latch pivotally connected with said side rods, and a breakable pin carried by the ends of the U-shaped latch and arranged to be engaged with the said shoulder of the said connector.

In testimony whereof I affix my signature.

HORATIO P. JONES.